United States Patent
Persson et al.

(10) Patent No.: US 10,084,301 B2
(45) Date of Patent: Sep. 25, 2018

(54) CABLE TRANSIT AND METHOD FOR MANUFACTURING SUCH CABLE TRANSIT

(71) Applicant: AXIS AB, Lund (SE)

(72) Inventors: Johan Persson, Billeberga (SE); Emma Dreher, Kavlinge (SE); Kristian Borg, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/375,600

(22) Filed: Dec. 12, 2016

(65) Prior Publication Data

US 2017/0179702 A1    Jun. 22, 2017

(30) Foreign Application Priority Data

Dec. 18, 2015    (EP) .................................... 15201044

(51) Int. Cl.
*H02G 3/22* (2006.01)
*H02G 15/013* (2006.01)
*H02G 15/18* (2006.01)

(52) U.S. Cl.
CPC ............. *H02G 3/22* (2013.01); *H02G 15/013* (2013.01); *H02G 15/18* (2013.01)

(58) Field of Classification Search
None
See application file for complete search history.

(56) References Cited

U.S. PATENT DOCUMENTS

| | | | |
|---|---|---|---|
| 4,842,364 A | 6/1989 | Chen | |
| 5,113,475 A * | 5/1992 | Baker | G02B 6/4471 385/138 |
| 5,290,073 A | 3/1994 | Chen | |
| 5,669,590 A * | 9/1997 | Przewodek | F16L 3/221 248/68.1 |
| 5,775,702 A | 7/1998 | Laeremans et al. | |
| 6,107,571 A * | 8/2000 | Damm | H02G 15/113 174/72 C |
| 7,442,884 B2 * | 10/2008 | Ball | H02G 15/013 16/2.1 |

(Continued)

FOREIGN PATENT DOCUMENTS

| | | |
|---|---|---|
| DE | 20 2006 006 020 U1 | 6/2006 |
| DE | 20 2008 002 464 U1 | 5/2008 |

OTHER PUBLICATIONS

European Search Report (with Written Opinion) dated Jun. 27, 2016 in European Application 15201044.3 filed on Dec. 18, 2015.

*Primary Examiner* — William H Mayo, III
*Assistant Examiner* — Hiram E Gonzalez
(74) *Attorney, Agent, or Firm* — Oblon, McClelland, Maier & Neustadt, L.L.P.

(57) ABSTRACT

A cable transit (100) is formed in one piece and comprises a frame (102) and a body formed from resilient material. The frame (102) is dimensioned to be inserted into an opening of a separating wall and has an axial extension L from a first end (104) to a second end (106). At least one through-hole (108) extends through the body in the axial extension thereof, and the cable transit is characterized in that the at least one through-hole (108) is defined by a cylindrical rim portion (110) and in that a volume (114) between the cylindrical rim portion (110) of the at least one through-hole and a frame (102) of the cable transit is recessed.

14 Claims, 2 Drawing Sheets

(56) References Cited

U.S. PATENT DOCUMENTS

| | | | |
|---|---|---|---|
| 7,615,714 B2 * | 11/2009 | Pyron | H02G 3/22 174/660 |
| 2009/0057008 A1 | 3/2009 | Knorr et al. | |
| 2012/0071029 A1 | 3/2012 | Millevik | |
| 2014/0308834 A1 | 10/2014 | Millevik | |

* cited by examiner

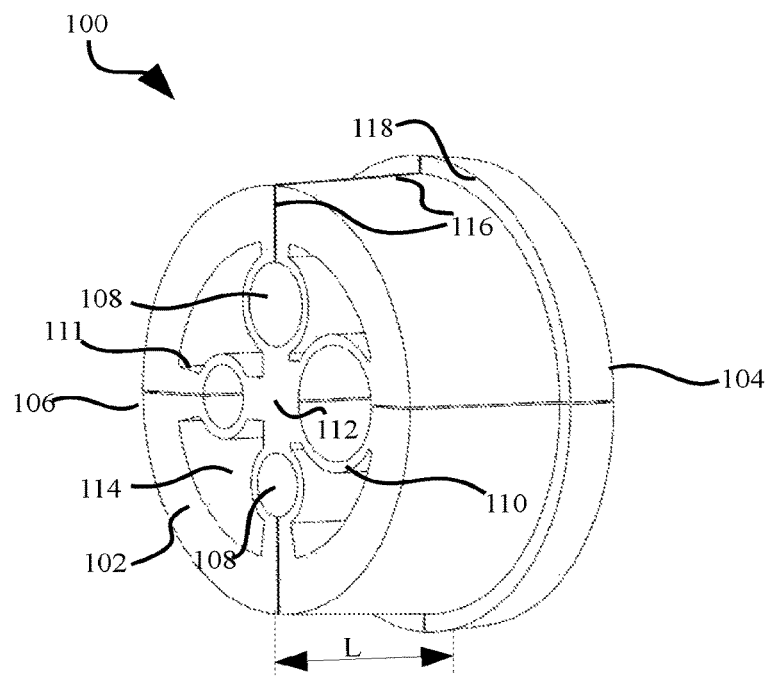
FIG. 1
FIG. 2
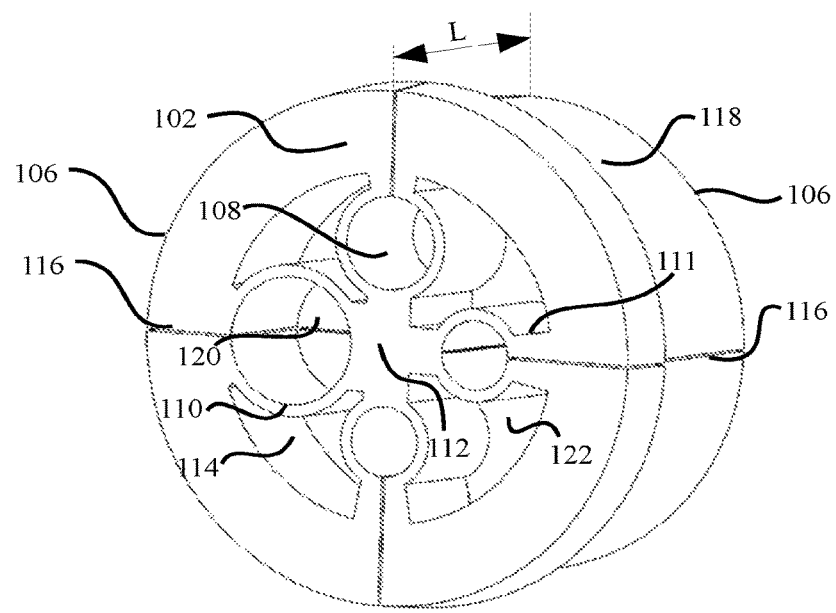

CABLE TRANSIT AND METHOD FOR MANUFACTURING SUCH CABLE TRANSIT

TECHNICAL FIELD

The invention relates to a cable transit, and in particular to an insect-proof cable transit, and to method for manufacturing such cable transit.

BACKGROUND

The use of cable transits, grommets and glands is well established, and the reason for using them may vary. Common reasons are ease of installation, durability and various degrees of proofing the volume inside of the transit. The proofing may e.g. relate to dust, moisture/water, fire or even explosion. Often one proofing may interact with another, such that a dust proof cable transit may provide some water proofing etc., and a particular transits may be certified according to various national or international standards.

The present invention relate to a cable transit developed to be insect-proof. This should not be construed as being limiting for the appended claims, since it merely is a functional description.

There is a vast amount of cable transits (or glands, grommets, lead-throughs, etc.) available in prior art, and since most transits will provide some degree of insect-proofing it should be understood that the design of the actual transit is paramount to the intended functionality when prior art is to be defined, and that subject will therefore be revisited in the detailed description.

For the applications of the present invention a typical insect would be a wasp or similar sized insect, and extending beyond the insect family it is beneficial if the cable transit prevents access for spiders as well. The purpose of the cable transit is to safeguard the function of the device for which it is used, which could be e.g. a surveillance camera or a housing therefore, and to prevent service staff from unwanted and possibly hazardous surprises when opening the device for service.

SUMMARY

One object of the present invention is to provide an improved insect proof cable transit, which allows for flexible and convenient mounting.

According to a first aspect, these and other objects are achieved, in full or at least in part by a cable transit formed in one piece. The cable transit comprises a frame, and a body formed from resilient material. The frame is dimensioned to be inserted into an opening of a separating wall and it has an axial extension L from a first end to a second end. At least one through-hole extends through the body in the axial extension thereof, and the at least one through-hole is defined by a cylindrical rim portion. A volume between the cylindrical rim portion of the at least one through-hole and the frame of the cable transit is recessed.

The provision of a recess will render the cable transit a structural resilience or flexibility. In this way the flexibility or resilience of the cable transit will be accomplished by means of the material used in the cable transit as well as by means of its design. The cable transit being formed in one piece will also add to the robustness.

In one or more embodiments the recessed volume extends from the first end of the body, and in other embodiments a recessed volume extends from both the first end and the second end of the body. In the latter case the recess extending from the first end of the body may be arranged opposite to the recess extending from the second end of the body. The recesses may be separated by a diaphragm. In the former embodiment the diaphragm may essentially be arranged at one end of the cable transit. Such an arrangement may be adequate in providing resilience and flexibility, yet a possible drawback may be that the diaphragm will be exposed, in particular in situations where it bulges out even further due to compression of the cable transit. The latter embodiment, where the diaphragm is arranged somewhere in the body, enables better protection of the diaphragm, and it also enables some additional effects which are discussed in the detailed description.

In one or more embodiments the diaphragm may be arranged at an approximate middle of the body, in the axial extension thereof, referring to the previous discussion.

The cable transit has a frame, and a number of through-holes defined by cylindrical rim portions. In embodiments where the cylindrical rim portions do not connect directly to the frame, a solid material bridge extends between the frame and the at least one through-hole. The solid material bridge provides structural stability to the flexible design, thus assisting in balancing the desire to have a highly resilient and flexible cable transit while still maintaining a robustness and integrity of the same.

To further simplify use of the cable transit it may, in one or several embodiments, comprise a slit extending from a radial perimeter of the body, into the at least one through-hole and along the axial extension of the body. The slit may be used when arranging a cable in the cable transit as will be discussed in the detailed description.

If there is a solid material bridge between the frame and the cylindrical rim of the through-hole it is preferred that the slit extends through the solid material bridge as well. An alternative could be to bypass the solid material bridge by arranging the slit in the frame to the side of the bridge, and to do the same thing in the cylindrical rim portion. Although possible, such arrangement may affect the structural stability of the cable transit negatively, and also the structural integrity of the diaphragm in which the slit would have to be arranged in such an alternative embodiment.

In embodiments where the cable transit comprises at least two through-holes, which would correspond to a majority of the foreseen embodiments, it is preferred that a support structure of solid material extends between the cylindrical rim portions of said at least two through-holes. The support structure resembles the solid material bridge previously described, apart from the location thereof, and the purpose and effect is also similar.

The design of the support structure may vary. In an embodiment where there are only two through-holes the design, or at least the positioning, is straightforward. When three or more through-holes are present, the rule is that each cylindrical rim portion should be connected to at least one other cylindrical rim portion (although not necessarily all other cylindrical rim portions). In the detailed description two versions will be shown, a first where the support structure acts like a central hub with spokes (extending over the entire length of the cable transit) extending outwardly towards each cylindrical rim portions, and a second where each cylindrical rim portion connects to the most adjacent cylindrical rim portions only. There are obviously other possible embodiments.

In any embodiment the frame of the body may be formed from solid material, providing structural stability to the cable transit.

Similar to the recessed volume, the at least one through-hole may be partitioned by a membrane at a position between the first end and the second end of the body. In this way a through-hole not occupied by a cable (in a mounted state) will still act as a barrier. A less convenient solution would have been to add a plug to the through-hole, yet the membrane being formed in the same piece as the rest of the body will simplify the accomplishment of the barrier function significantly.

To further increase the versatility of the cable transit it may, in one or several embodiments therefore, be designed such that the frame tapers off in the direction of the second end. The tapered design may simplify assembly of the cable transit in the opening of the structure, and it will also enable fitting of the same cable transit in openings of various diameter.

In one or more embodiments the cable transit may further comprise a radial flange extending outwardly from the first end of the body, which will act so as to position the cable transit in the opening, e.g. preventing it from being pushed through the opening during assembly.

The cable transit of any preceding claim, wherein at least the body is formed from a polymer material, such as a silicone compound or rubber compound, wherein material of the body has a hardness of 30-70 Shore A, preferably 35-50 Shore A, and still more preferably about 40 Shore A. The use of a frame, and in further embodiments the other supporting structures, will enable use of a soft rubber, while the addition of recessed volumes makes an "actual resilience" even better than what is provided by the properties of the material alone. As such the properties in regard of resilience may approach and even exceed those of a foamed material while still offering structural stability in critical areas, such as the contact area between the frame and a surrounding structure as well as between the cylindrical rim portion and a cable arranged therein, exceeding the structural stability of a foamed material, a type of material which may not be desirable in the applications of the present cable transit.

In the most straightforward embodiments the frame may be formed from the same material as the body. In this way the entire cable transit may be produced in a single forming process. Also the integrity of the cable transit may benefit from being formed in one piece. The use of portions having different structural properties (the frame, the diaphragms, the cylindrical rim portions, etc.) will still allow for the desired properties to be accomplished in the various portions. In other embodiments the cable transit may be formed in an overmoulding or co-moulding procedure, enabling for use of different material compounds in different portions. The frame could e.g. be formed from a harder, more rigid material in line with its intended function, and the same could be applied to the bridges, to the support structures, to the cylindrical rim portions, etc.

The form of the opening in the structure into which the cable transit is to be arranged will most likely be circular. Thus the cross section of the cable transit is believed to be circular in most embodiments. However, the features described above and below does not rely on a circular cross section, and it will not affect a method for manufacturing the cable transit. Therefore the cable transit may in principle have any cross sectional shape, such as circular, oval or polygonal. Within that wide area examples include quadratic, rectangular, pentagonal, hexagonal, heptagonal or octagonal.

A method for manufacturing a cable transit according to the above or below description could comprise preparing a mould cavity by arranging a first mould half in a facing relationship with a second mould half, wherein the first and second tool comprises aligned first extensions for forming the at least one through-hole, and second extensions for forming the recesses, closing the mould cavity, injecting material into the mould cavity, allowing the material in the mould cavity to set, and demoulding the resulting cable transit.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a through-hole" or "the through-hole" may include several through-holes, and the like. Furthermore, the word "comprising" does not exclude other elements or steps.

BRIEF DESCRIPTION OF THE DRAWINGS

These and other aspects of the present invention will now be described in more detail, with reference to the appended drawings showing embodiments of the invention. As illustrated in the figures, the sizes of layers and regions are exaggerated for illustrative purposes and, thus, are provided to illustrate the general structures of embodiments of the present invention. Like reference numerals refer to like elements throughout.

FIG. 1 is a perspective view of a cable transit according to a first embodiment of the present invention.

FIG. 2 is a perspective view of a cable transit similar to the one presented in FIG. 1, yet from an opposite direction.

DETAILED DESCRIPTION

Figure 3:
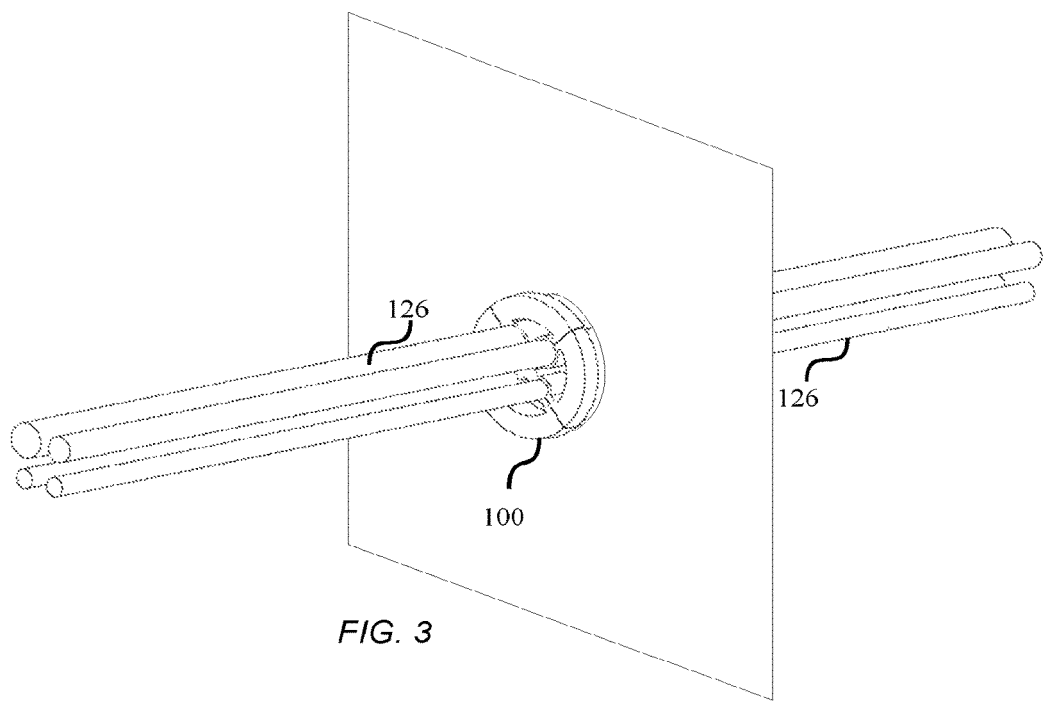
FIG. 3 is a perspective view of the cable transit of FIG. 2, with cables arranged.

To further explain the present invention it will be described in reference to a number of embodiments thereof. FIG. 1 is a perspective view illustrating a first embodiment of the present invention. A cable transit 100 is shown. The cable transit 100 is formed from a resilient body having a frame 102 defining a shape dimensioned to be inserted in an opening of a delimiting structure such as a wall, a ceiling, a plate of a box etc. The frame has a first end 104 and a second end 106 and an axial extension L there between. A total of four through-holes 108 extend from the first end 104 to the second end 106, radially inside of the frame 102. The through-holes 108 may preferably be dimensioned to receive cables or pipes of specific diameters and may as such be tailor-made for a particular installation. When discussing the properties of the material from which the body is made it will be made obvious that the material in combination with the design of the cable transit will result in high tolerances in cable diameters without compromising the purpose of the cable transit.

Each through-hole 108 is defined by a cylindrical rim portion 110, and on a radially outer side the cylindrical rim portion 110 is connected with the frame 102, either directly which is the case for the through-hole having the largest diameter, or indirectly via a material bridge 111, which is the case for the other through-holes. On a radially inner side the cylindrical rim portions connect to a supporting structure 112. The cylindrical rim portion 110 has a radial extension providing some structural stability to the cable transit 100, and the supporting structure 112 aids in supporting this purpose as well. Without these structures it is likely that the structural stability of the body becomes too low, which could result in that the cylindrical rim portions are displaced in a way that strains the structure of the body to the extent that it tears apart. With the present design both the cable transit and any cables arranged therein will be held in place adequately.

In the illustrated embodiments both the material bridges 111 and the supporting structure 112 extends along the full axial extension of the cable-transit. In other embodiments these structures 111 and 112 may instead extend over portions of the axial extension, comprise several portions etc. Recesses 114 are defined between the cylindrical rim portions 110 and the frame 102, where these are not connected. The recesses 114 will reduce the material used for forming the cable transit 100 and it will allow for an increased structural flexibility of the cable transit, even if the material from which it is formed is not all that resilient. In terms of production the reduced amount of material and the larger exposed surface areas will increase the rate of cooling, thus it will reduce the cycle time for a mould tool used to form the cable transit. This could be compared to a cable transit of the type disclosed in DE1972078U, where any flexibility or resilience will have to be provided by an appropriate selection of material used in the cable transit.

A slit 116 extends from a radial perimeter of the body, into each through-hole 108. The slit may preferably extend along the entire axial extension of the body, such that cables (or cable-like structures) may be arranged in the through-hole merely by opening it up. This may be a more convenient arrangement than threading a first end of the cable through the through-hole, which would have been the option in the absence of the slit 116. As such the slit 116 enables swift installations as well as simplified retrofit in existing installations. When there is a material bridge 111 the slit 116 preferable extends through the material bridge 111 as well, as is illustrated in the drawings. The advantage of having slits is obvious when considering an installation where cables are already installed such that their free end is locked in position. However, even in situations where there is a free cable end available, and threading of the cable end through the through-hole could be an option it may still be more convenient to make use of a slit, in particular if there is a large connector, significantly larger than the diameter of the cable itself, arranged on the free end of the cable. Another reason could be that the cables are arranged in a bundle, yet another could be that the cables are stiff and cumbersome to work with, and still other reasons could be that the cable ends are delicate and sensitive to touch or that the cables as such are too delicate to be pushed through the through-opening and the associated membrane.

For further simplification of an installation procedure the cable transit of the present embodiment is provided with a radial flange 118 extending from the first end of the body. The radial flange will localize the cable transit as it is arranged in the opening of the delimiting structure.

In FIG. 2 a perspective view of a second embodiment of a cable transit. The design is very similar to the one illustrated in FIG. 1. The only two details not shown in FIG. 1 is that each through-hole has a membrane 120 arranged at a position between the first end and the second end. The membrane 120 will prevent free passage through a through-hole 108 also in the case where a cable is not arranged in the through-hole. The membrane 120 corresponds to a thin delimiting wall, and preferably it easily tears open when a cable is arranged in the through-hole. In some embodiments the membrane 120 may be provided with a small perforation or tear initiation to further simplify the arrangement of a cable. One first perforation or tear initiation may be arranged in the extension of the slit 116, such that the membrane 120 readily opens once the slit 116 is opened. Still a further perforation or tear initiation may be arranged at right angles to the first, such that the membrane 120 folds away nicely when a cable is arranged therein.

One effect of having the membrane 120 arranged somewhere between the first and the second end (for example in the approximate middle there between) rather than at (or on) the first or second end is that the membrane 102 is well protected. This does not affect the through-holes being occupied by cables, yet the membrane of a through-hole left without a cable, e.g. for future use, should preferable be maintained in an intact state until it is used.

Furthermore a similar membrane may be present in the recesses 114, and for the sake of clarity these membranes will be referred to as diaphragms 122. Whereas the membranes 120 are likely to be penetrated by a cable, the diaphragms are not. For this reason the thickness (in an axial direction) of the diaphragms 122 may be increased as compared to the membranes 120 (e.g. about 1.5 mm as compared to 0.5 mm). The diaphragms 122 will present a barrier towards passage through the recesses, while still allowing the cable transit, and in particular the body thereof, to flex significantly. The diaphragms 122 are preferably arranged in an approximate middle of the body, such as to be well protected. The diaphragms connect to the cylindrical rim portions and it is preferred that all diaphragms connecting to a specific cylindrical rim portion connect at the same axial position. In this way the diaphragms may act as a "hinge" around which the cylindrical rim portion may pivot. Other arrangements of the diaphragms will allow for a pivoting action as well, even in case neighboring diaphragms are shifted in axial position, yet it may be more limited and it may introduce a higher strain on the material, which is not desirable. In still a further embodiment the diaphragms are arranged such that their axial position will coincide with the axial position at which the cable transit contacts the surrounding wall. This will ensure that forces transferred from the cable arranged in the cable transit, via the diaphragms and the frame, may be absorbed by the surrounding wall to a high extent. For example the diaphragms may be arranged at an axial position immediately to the side of the radial flange 118, or between said side and at a distance towards the second end 106, such as to increase the probability for the diaphragm to be aligned with the wall in a mounted state.

The resilience of the material as well as the resilience introduced by the design of the cable transit enables it to receive cables of various diameter and even number while still providing a barrier in relation to spiders and insects such as wasps and bees.

FIG. 3 illustrates a cable transit according to FIG. 2 with cables 126 of various diameter arranged therein. The cable transit will provide a barrier against various bugs (insects and spiders) yet it will also to some extent provide a barrier against dust and moisture. Depending on the properties it may also provide some cable-strain relief, although it is not the main purpose of the cable transit.

Figure 4:
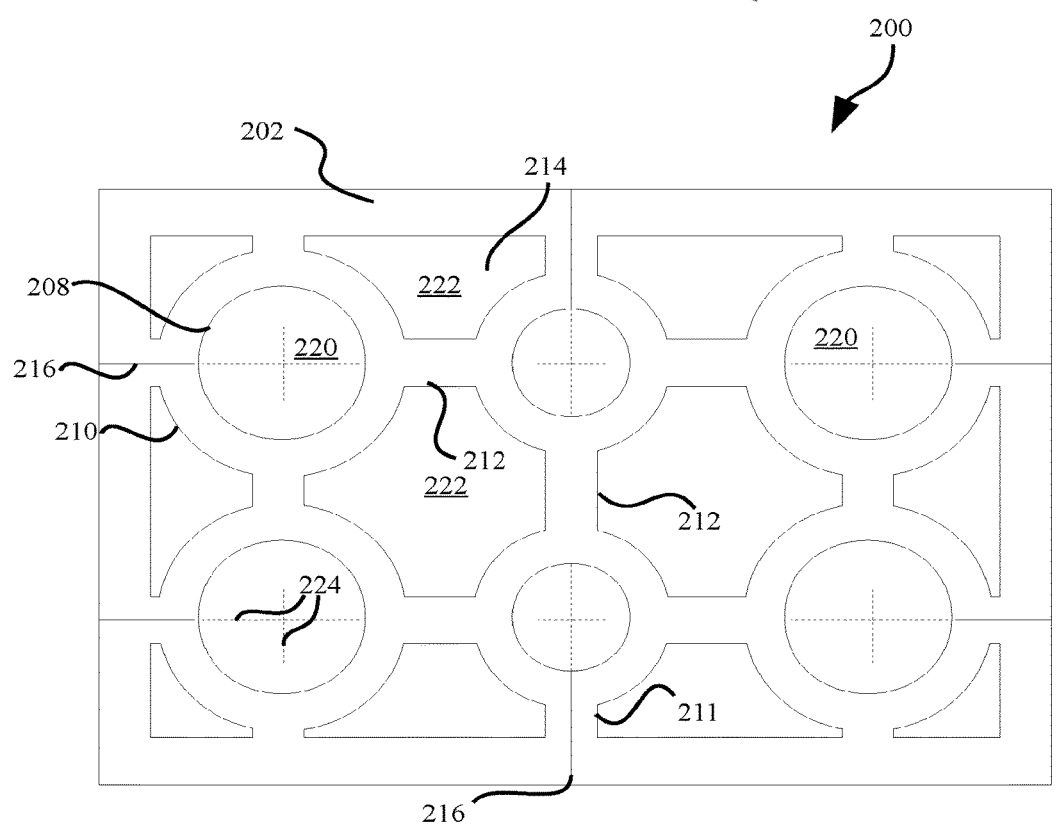
FIG. 4 is a plan view of a cable transit according to a further embodiment of the present invention.

FIG. 4 illustrate a cable-transit according to a further embodiment of the present invention. The main difference between this embodiment and the previous embodiments is the cross sectional shape, and the number of through openings. Apart from that it may comprise the same features ranging from the frame 202 (corresponding to the frame 102) to the diaphragm 222 (corresponding to the diaphragm 122). Like features have been given like references numerals throughout, in accordance with the pattern indicated. In the view of FIG. 4 the perforations or tear initiations 224 are clearly indicated.

In any embodiment the frame 102 (or 202) may taper off towards one end of the cable transit, such that an effective diameter of the cable transit is reduced towards one end thereof. This will further increase the flexibility of the cable transit, such that it will be possible to accommodate it in openings of various diameters. The flange 118 will act as a distinct stop, such that the cable transit is not pushed or pulled through the opening when it is arranged therein. Embodiments without a circular cross section may also be tapered in the same manner, though it may be more correct to state that in such a case the cross sectional dimensions would decrease towards one end of the cable transit.

Furthermore, due to the properties of the material (apart for the embodiments where the frame is made from a more rigid material) the cable transit will adjust to the shape of the opening, at least to some extent. Thus, even if an opening is polygonal (such as hexagonal or octagonal) a cable transit with circular cross section may ensure an adequate seal. Notwithstanding this forgiving nature of the cable transits various cross sections may obviously be provided without departing from the scope of the appended claims. Such cross sectional shapes may include circular, oval or polygonal, such as quadratic, rectangular, pentagonal, hexagonal, heptagonal, octagonal etc., in symmetrical or non-symmetrical arrangements. A circular cross section is believed to be the most preferred, followed by a rectangular cross section. The same generalization may be true for the shape of the cylindrical rim portion. In the disclosed embodiments it has the shape of a hollow cylinder of circular cross section, since the cables to be arranged therein has an approximate circular cross section. In other embodiments the cross section of the cylindrical rim portion may differ from circular, much in the same as stated for the shape of the cable transit as such.

In other embodiments (not shown) the cable-transit may be co-moulded from more than one material or over-moulded, while still being formed in one piece. For example, the frame may be made of a first material, and the body (the interior, inside of the frame) may be made of a second material. In such an embodiment the material of the frame may be significantly more rigid than the body, such as to provide structural stability. In other aspects such an embodiment would be similar to the previously disclosed embodiments. Other alternatives could be that the material of the support structure 112 is more rigid than the rest of the body, and particular embodiments it could be the same as the material of the frame, while in others the material of the support structure may differ in properties (such as hardness) from both the frame and the rest of the body.

A cable transit according to any one of the embodiments may be formed in one piece, e.g. by injection moulding or compression moulding. The absence of undercut structures enables use of a simple mould cavity consisting of two mould halves. Depending on the particular embodiment the design of the mould cavity may vary, but the general procedure is presented in the following.

In a functional sense a tool for manufacture of a cable transit according to any of the presented embodiment merely needs a two-part mould. Each mould half would have protrusions for forming through-holes 108;208 and recesses 114;214 respectively, the protrusions of each mould half reaching to the membrane 120;220 and the diaphragm 122;222 respectively. For embodiments having a tear indication or perforation in the membrane 120;220 one or both mould halves may have ridges on the free end of each protrusion, such that the mould halves essentially meet thus forming the tear indication or perforation.

The material used for the cable transit may be soft enough to allow for some undercut surfaces, yet for an embodiment having the flange 118 it would be preferred for the first and second mould half to meet somewhere along an axial extension of the flange 118.

Depending on their dimensions the slits 116 may or may not be formed in the moulding process. If not, the slits may be arranged in a post-moulding step, e.g. by controlled slitting with an industrial blade. In any embodiment previously presented the slits may be arranged closer to mounting the cable transit in the opening, e.g. not in or in direct connection to the moulding process, but rather by the actual service staff being responsible for mounting the cable transit in the opening. In this way the service staff may decide to arrange slits only where needed, e.g. if 3 of 4 through-holes are used the last one may be left without a slit. It may be an advantage to maintain the integrity of the cable transit, at least from a strength point of view. In an embodiment where the cable transit is shipped to service staff without being slit first, the service staff may choose to thread a cable through the through-hole without arranging a slit through the frame yet for the general case this would be considered unnecessarily cumbersome.

The cable transit may be manufactured in several different ways, and the purpose of the above is merely to disclose one of these.

The material of the cable transit may be a polymer material, such as a silicone compound or rubber compound. The actual selection may depend on a particular application, and for the presented embodiments a silicone KE 9250-U has been used.

A cable transit of any preceding embodiment will provide an insect barrier preventing some of the most unwanted insects, as well as bugs and spiders, from climbing along cables to enter a device. The main objective of the inventors has been to provide a cable transit preventing nest building insects, such as wasps and bees, as well as spiders, from entering. Such uninvited guests may cause short-circuits and other malfunctions, and they may also prevent service staff from accessing the device, or at least cause great discomfort and bodily harm. A typical application could be a surveillance camera, or a housing thereof. A surveillance camera, in particular when situated outdoors, may provide an attractive nesting place for wasps as well as spiders, and while wasps are a potential and direct hazard for service staff, spiders weaving webs in front of the camera lens are a common cause of malfunction. Ensuring that cable openings into cameras, camera housings, camera posts etc. are insect proof thus improves the performance of a camera in several ways. There are many cable transits that could be used for achieving that purpose, yet the present cable-transit provides a convenient alternative offering an affordable and reliable function.

The invention claimed is:

1. A cable transit formed in one piece, comprising
a frame and a body formed from resilient material, the frame being dimensioned to be inserted into an opening of a separating wall and having an axial extension L from a first end to a second end,
at least one through-hole extending through the body in the axial extension thereof,
wherein at least one through-hole is defined by a cylindrical rim portion and a recess is defined by the cylindrical rim portion and the frame, the recess being partitioned by a diaphragm.

2. The cable transit of claim 1, wherein the recess extends from the first end of the body.

3. The cable transit of claim 1, wherein the recess extends from both the first end and the second end of the body, and wherein the recess extending from the first end of the body is arranged opposite to the recess extending from the second end of the body.

4. The cable transit of claim 3, wherein the diaphragm is arranged at an approximate middle of the body, in the axial extension thereof.

5. The cable transit of claim 1, wherein a solid material bridge extends between the frame and the at least one through-hole.

6. The cable transit of claim 1, further comprising a slit extending from a radial perimeter of the body, into the at least one through-hole and along the axial extension of the body.

7. The cable transit of claim 1, further comprising at least two through-holes, wherein a support structure of solid material extends between the cylindrical rim portions of said at least two through-holes.

8. The cable transit of claim 1, wherein the frame of the body is formed from solid material, providing structural stability to the cable transit.

9. The cable transit of claim 1, wherein the at least one through-hole is partitioned by a membrane at a position between the first end and the second end of the body.

10. The cable transit of claim 1, wherein the frame tapers off in the direction of the second end.

11. The cable transit of claim 1, further comprising a radial flange extending outwardly from the first end of the body.

12. The cable transit of claim 1, wherein at least the body is formed from a silicone compound or rubber compound, wherein material of the body has a hardness of 30-70 Shore A.

13. The cable transit of claim 12, wherein the frame is formed from the same material as the body.

14. The cable transit of claim 1, the cable transit having a cross-sectional shape being circular, oval or polygonal, such as quadratic, rectangular, pentagonal, hexagonal, heptagonal or octagonal.

* * * * *